US005621251A

United States Patent [19]

Yamazaki

[11] Patent Number: 5,621,251

[45] Date of Patent: Apr. 15, 1997

[54] DOOR LOCKING AND CONSTRAINING APPARATUS AND METHOD OPTIONALLY INCLUDING STARTER DISCONNECT

[75] Inventor: Takehiko Yamazaki, Kawasaki, Japan

[73] Assignee: Nissan Motor Co., Ltd., Kanagawa-ken, Japan

[21] Appl. No.: 228,622

[22] Filed: Apr. 18, 1994

[30] Foreign Application Priority Data

Apr. 21, 1993 [JP] Japan .................................... 5-094521

[51] Int. Cl.$^{6}$ ............................ B60R 25/04; E05B 65/36

[52] U.S. Cl. ........................... 307/10.2; 70/264; 180/287; 307/10.3

[58] Field of Search ................................. 307/10.1, 10.2, 307/10.3, 10.6; 70/237, 264; 180/287, 289; 123/198 DC

[56] References Cited

U.S. PATENT DOCUMENTS

| | | | |
|---|---|---|---|
| 4,440,006 | 4/1984 | Kleefeldt | 70/237 |
| 4,444,032 | 4/1984 | Stier et al. | 70/264 |
| 4,519,227 | 5/1985 | Dumbser et al. | 70/264 |
| 4,787,223 | 11/1988 | Gotanda | 70/264 |
| 4,910,980 | 3/1990 | Katoh | 70/264 |
| 5,184,022 | 2/1993 | Claar et al. | 307/10.2 |
| 5,248,898 | 9/1993 | Périou | 307/10.1 |

FOREIGN PATENT DOCUMENTS

| | | |
|---|---|---|
| 4301412A1 | 7/1994 | Germany . |
| 4-24046 | 6/1992 | Japan . |
| 2227516 | 8/1990 | United Kingdom . |
| 2257467 | 1/1993 | United Kingdom . |

*Primary Examiner*—Richard T. Elms

*Attorney, Agent, or Firm*—Lowe, Price, LeBlanc & Becker

[57] ABSTRACT

An antitheft apparatus for an automotive vehicle includes: door lock mechanism assemblies (110, 210, 310 and 410) for locking vehicle doors, respectively; constraining (stopper) members for constraining the door lock mechanism assemblies once actuated to a lock status so as not to be unlocked, respectively; a set switch (125) for outputting a constraint command for constraining the door lock mechanism assemblies once actuated to the lock status so as not to be unlocked; and a controller (1) responsive to the constraint command outputted by the set switch, for first locking the doors by the door lock mechanism assemblies and then constraining the door lock mechanism assemblies to the lock status by use of constraining members, respectively. When the command for constraining the door lock status is outputted, since the doors are first locked by the lock mechanism assemblies and thereafter the lock mechanism assemblies are constrained to the lock status, even if the door is unlocked after the doors have been locked, it is possible to securely constrain all the doors to the lock status.

14 Claims, 11 Drawing Sheets

DOOR LOCKING AND CONSTRAINING APPARATUS AND METHOD OPTIONALLY INCLUDING STARTER DISCONNECT

BACKGROUND OF THE INVENTION

1. Field of the Invention

The present invention relates to an antitheft apparatus for an automotive vehicle for locking vehicle doors double.

2. Description of the Prior Art

In this specification, a function of further constraining locked doors so as not to be unlocked is referred to as "dead (i.e., double)-lock", and a function of setting the locked doors to the dead-lock status is referred to as "set" and a function of releasing the dead-locked doors from the dead-lock status is referred to as "reset".

An antitheft apparatus for an automotive vehicle such that vehicle doors once locked are further constrained so as not to unlocked is disclosed in Japanese Published Examined Utility Model Application No. 4-24046, for instance.

In the above-mentioned antitheft apparatus, when a key is inserted into a key cylinder of a door and further rotated to a lock position, a lock signal is transmitted from a controller to door lock actuators of all doors of an automotive vehicle, so that the door lock actuators of all the doors are actuated to lock all the doors by door lock mechanisms. Further, when the key is rotated to a set position, a set signal is transmitted from the controller to door dead-lock actuators of all doors of the automotive vehicle, so that the door dead-lock actuators of all the doors are actuated to insert a stopper member to all the door lock mechanisms, respectively for setting the vehicle doors.

Further, in the conventional antitheft apparatus, door lock knobs are provided inside the vehicle doors. Therefore, when the door lock knob is operated, the door can be locked or unlocked from the inside of the vehicle.

In the conventional antitheft apparatus as described above, however, in case all the vehicle doors are locked with the use of the door key without noticing the presence of a passenger still remaining within the vehicle room, the passenger within the vehicle room sets the door lock knob to an unlock position to unlock the door, before getting out of the vehicle. In this case, as far as the passenger sets the door lock knob once to a lock position and then closes the door, the doors can be locked. However, when the passenger closes the door without setting the door lock knob to the lock position, the door is left unlocked.

Consequently, in the conventional antitheft apparatus, there exists a problem in that even if a driver inserts the door key and rotates the key to the set position to set all the doors, the door (through which the passenger has gotten out of the vehicle) is left unlocked and therefore cannot be set.

Further, in the case as described above, when the driver rotates back the key once to the unlock position and then rotates the key from the lock position to the set position, all the doors can be set. However, this operation is troublesome and therefore involves a problem in that the manipulatability of the antitheft apparatus is not high.

SUMMARY OF THE INVENTION

Accordingly, it is the object of the present invention to provide an antitheft apparatus for an automotive vehicle, by which all the doors can be set as far as the key is directly rotated to the set position, without returning the key once to the unlock position, in case the driver has locked the doors and thereafter a passenger remaining within the vehicle gets out of the vehicle without locking the door.

Further, another object of the present invention is to provide an antitheft apparatus for an automotive vehicle, by which when the door is dead-locked (double locked), the engine starter motor will not be started.

To achieve the above-mentioned first object, the present invention provides an antitheft apparatus for an automotive vehicle, comprising: locking means for locking vehicle doors; constraining means for constraining said locking means once actuated to a lock status so as not to be unlocked; commanding means for outputting a constraint command for constraining said locking means once actuated to the lock status so as not to be unlocked; and drive control means responsive to the constraint command outputted by said commanding means, for first locking the doors by said locking means and then constraining said locking means to the lock status by said constraining means.

Further, the present invention provides a method of theft prevention for an automotive vehicle by an antitheft apparatus having: locking means for locking vehicle doors; constraining means for constraining said locking means once actuated to a lock status so as not to be unlocked; and commanding means for outputting a constraint command for constraining said locking means once actuated to the lock status so as not to be unlocked, which comprises the steps of: when said commanding means outputs the constraint command, locking the doors by said locking means; and constraining said locking means to the lock status by said constraining means.

In the antitheft apparatus for an automotive vehicle according to the present invention, whenever the constraint command for constraining the locked doors is outputted, the doors are once locked and thereafter the locking means are constrained. Therefore, ever if the doors are locked and then unlocked, whenever the door constraint is required, the doors can be locked automatically. Accordingly, it is unnecessary to lock the doors again, thus eliminating the troublesome door constraining operation for improvement in manipulability of the antitheft apparatus for an automotive vehicle.

Further, to achieve the second object, the present invention provides an antitheft apparatus for an automotive vehicle, comprising: locking means for locking vehicle doors; constraining means for constraining said locking means once actuated to a lock status so as not to be unlocked; an ignition key for connecting and disconnecting a current supply path to and from a starter motor; and drive and control means responsive to a constraint status of said constraining means, for disconnecting the current supply path from the starter motor even when the ignition key is turned on.

In the antitheft apparatus for an automotive vehicle according to the present invention, as far as the constraining means is actuated, even if the ignition key is turned on, since the starter motor will not be operated, it is possible to prevent the automotive vehicle form being stolen more securely.

DETAILED DESCRIPTION OF THE PREFERRED EMBODIMENTS

An embodiment of the present invention will be described hereinbelow with reference to the attached drawings.

Figure 1:
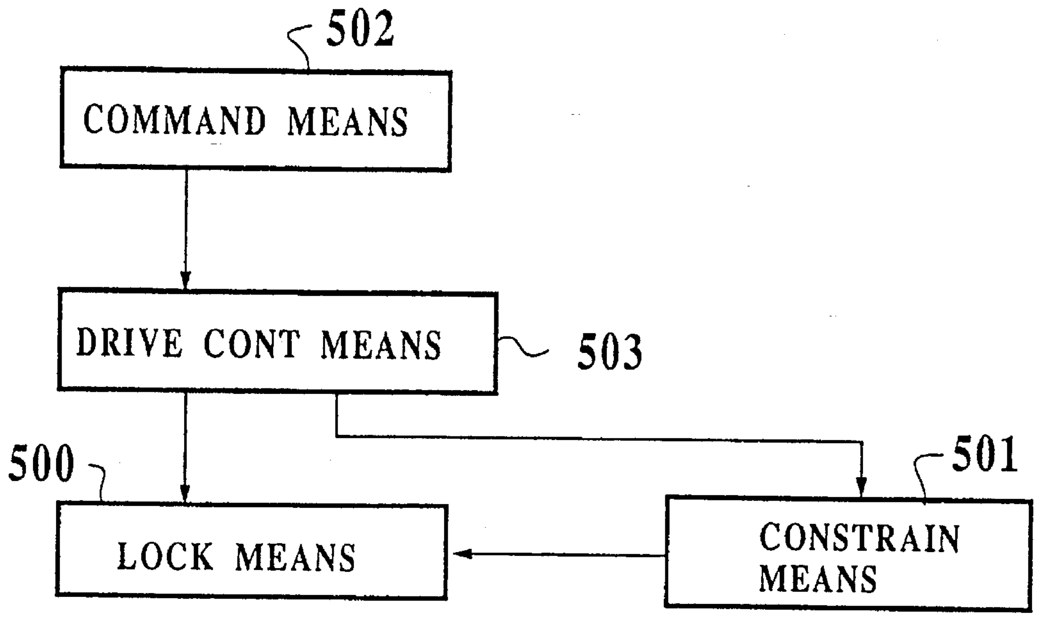
FIG. 1 is a schematic block diagram showing the antitheft apparatus for an automotive vehicle according to the present invention.

FIG. 1 is a schematic block diagram showing the antitheft apparatus for an automotive vehicle according to the present invention. In the drawing, the antitheft apparatus comprises locking means 500 for locking vehicle doors; constraining means 501 for constraining the locking means 500 once actuated to a locked status so as not to be unlocked; commanding means 502 for outputting a constraint command for constraining the locking means once actuated to the locked status so as not to be unlocked; and drive control means 503 responsive to the constraint command outputted by the commanding means 502, for first locking the doors by the locking means 500 and then constraining the locking means 500 to the locked status by the constraining means 501.

Figure 1A:
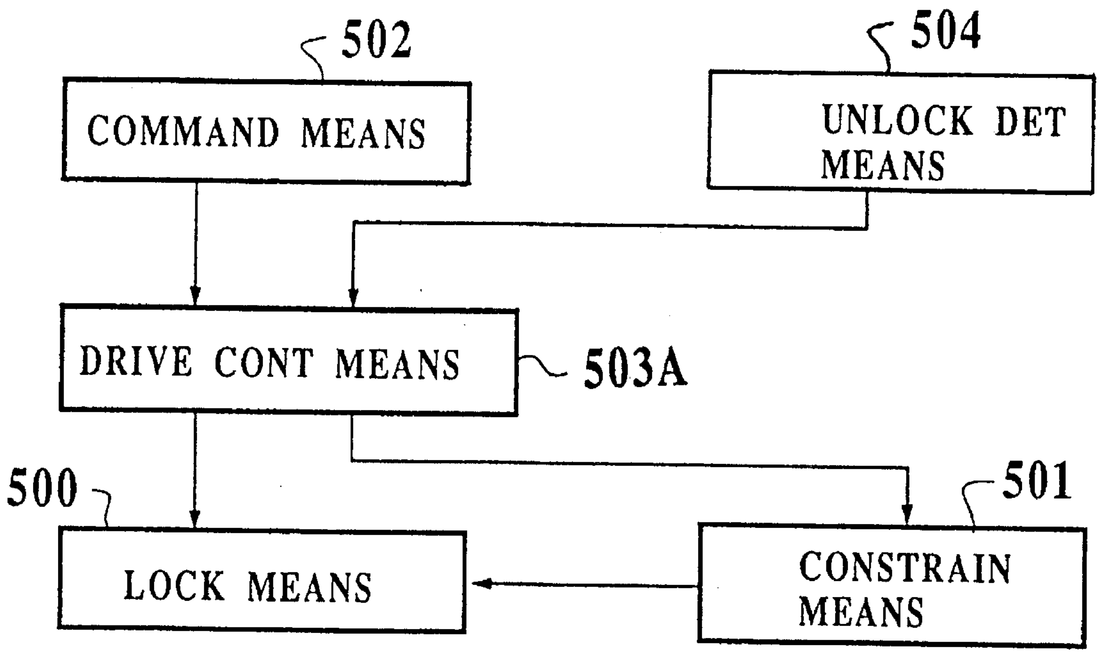
FIG. 1A is a schematic block diagram showing a modified version of the FIG. 1 embodiment with an unlock detecting means.

Further, as depicted in FIG. 1A, in a modified version of the FIG. 1 embodiment the antitheft apparatus further comprises unlock detecting means 504 for detecting an unlock status of the locking means 500. In the antitheft apparatus, when the commanding means 502 outputs a constraint command for constraining the locking means to locked status and further the unlock detecting means 504 detects the unlock status of the locking means 500, the drive control means 503A first locks the doors by the locking means 500 and then constrains the locking means 500 to the lock status by the constraining means 501.

Further, as already described, the function of further constraining once locked doors to an unlockable status is referred to as "dead (double)-lock"; the function of setting the locked doors to the dead-lock status is referred to as "set"; and the function of releasing the dead-locked doors from the dead-locked status is referred to as "reset", hereinafter.

Figure 2:
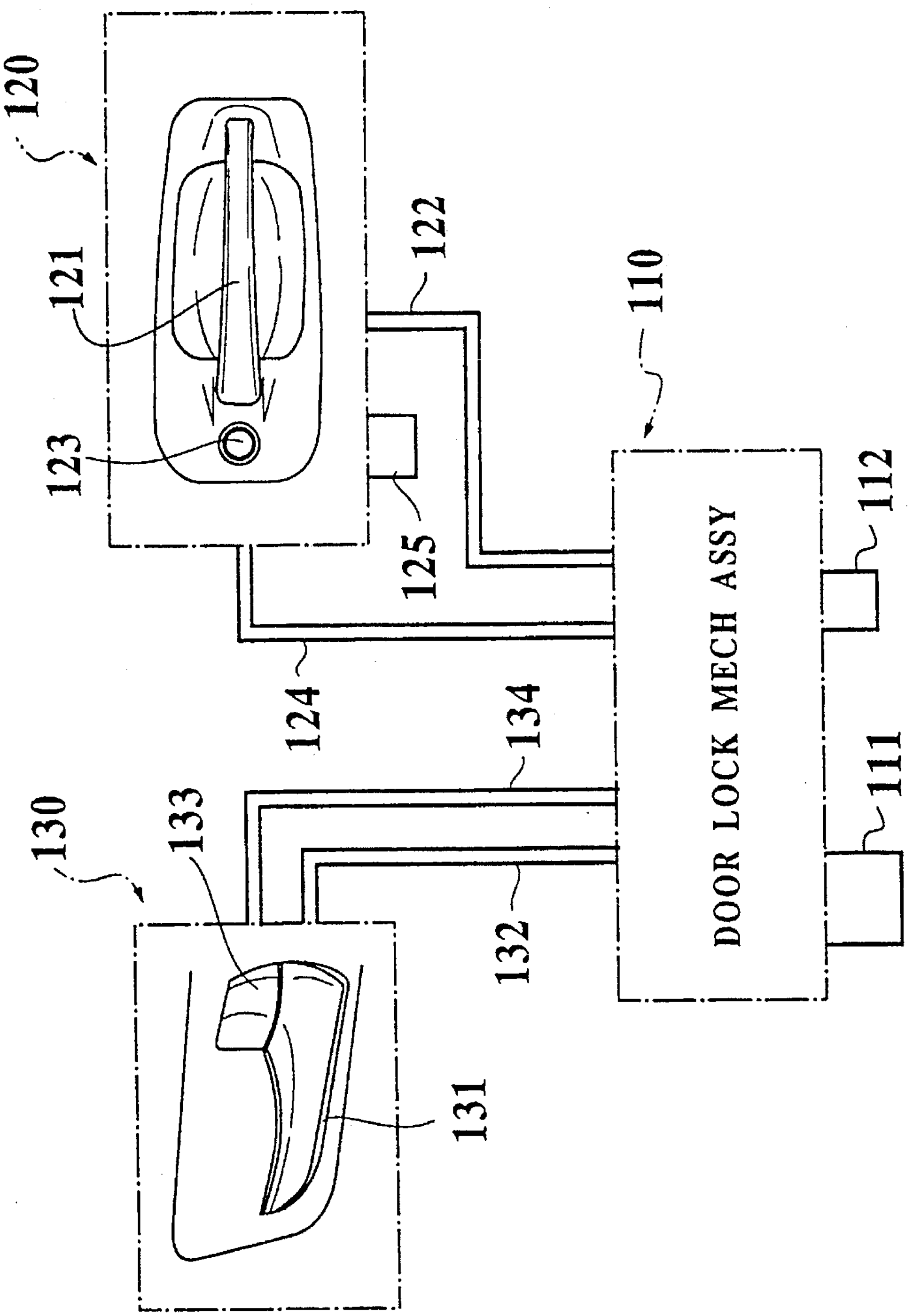
FIG. 2 is a block diagram showing one embodiment of a door lock mechanism provided for a driver's seat side door according to the present invention.

FIG. 2 shows an embodiment of a door lock mechanism provided for a driver's seat side vehicle door. In the drawing, a door lock mechanism assembly 110 locks or unlocks and sets or resets the driver's seat side door. The door lock mechanism assembly 110 includes a door lock actuator 111 and a status switch 112. The door lock actuator 111 drives the door lock mechanism assembly 110 to lock and unlock the driver's seat side door. The status switch 112 is turned off when the door lock mechanism assembly 110 changes from an unlocked status to a locked status, and turned on when changes from the locked status to the unlocked status.

Further, an outside handle assembly 120 provided outside the driver's seat side door and an inside handle assembly 130 provided inside the driver's seat side door are both linked to the door lock mechanism assembly 110 via various rods.

Under the conditions that the driver's seat side door is in the unlocked status and further a reset status, when an outside handle 121 of the outside handle assembly 120 is actuated, an unlock actuation force is transmitted to the door lock mechanism assembly 110 via an outside handle rod 122, so that the driver's seat side door can be opened by the door lock mechanism assembly 110.

In the same way, under the conditions that the driver's seat side door is in the unlocked status and further a reset status, when an inside handle 131 of the inside handle assembly 130 is actuated, an unlock actuation force is transmitted to the door lock mechanism assembly 110 via an inside handle rod 132, so that the driver's seat side door can be opened by the door lock mechanism assembly 110.

Further, under the conditions that the driver's seat side door is in the locked status or the set status, even if the outside handle 121 or the inside handle 131 is actuated, the driver's seat side door cannot be opened.

When a key is inserted into a key cylinder 123 of the outside door handle assembly 120 and then rotated, an actuation force thereof is transmitted to the door lock mechanism assembly 110 via a key rod 124, so that the door lock mechanism assembly 110 is locked or unlocked and set or reset according to the angular positions of the key.

Figure 3:
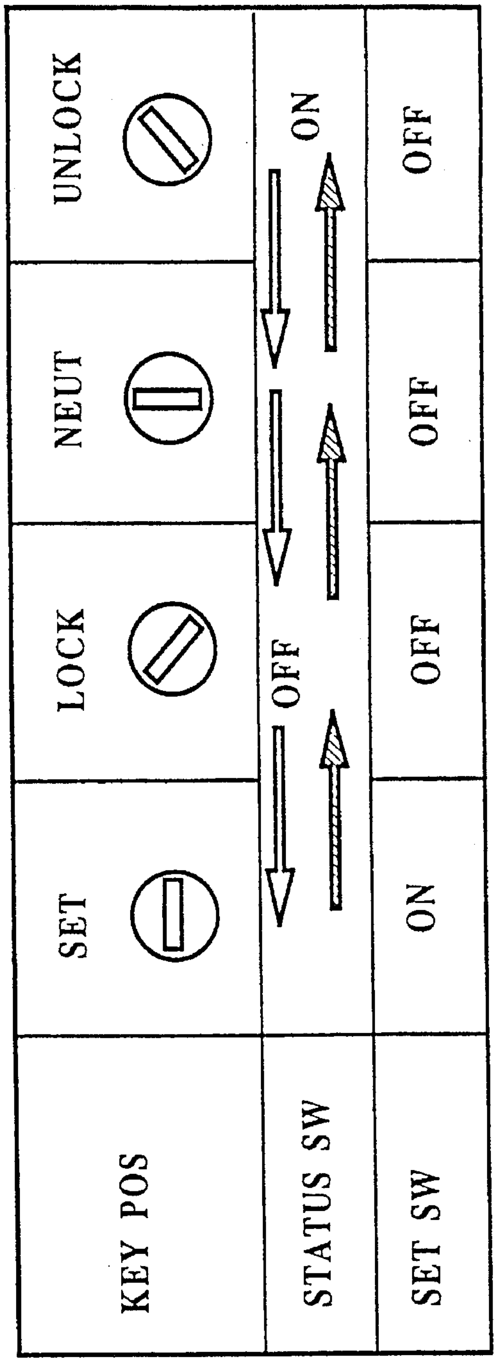
FIG. 3 is a table listing on-off relationship between key positions of the driver's seat side door and a door lock mechanism assembly (a status switch and a set switch)

FIG. 3 shows the relationship between the angular positions of the key inserted into the driver's seat side door and the door lock mechanism assembly 110.

That is, when the key is inserted into the key cylinder 123 of the driver's seat side door and then rotated from a neutral position to a lock position, since the door lock mechanism assembly 110 is actuated via the key rod 124, the driver's seat side door is locked and further the status switch 112 is turned off.

Further, in this case, a drive force is transmitted from the door lock mechanism assembly 110 to the inside handle assembly 130 via a lock knob rod 134, so that a lock knob 133 of the inside handle assembly 130 is driven toward the lock side.

Further, when the key is released from the driver's hand at the lock position, although the key is returned to the neutral position by an elastic force of a spring (not shown), the lock status of the door lock mechanism assembly 110 is not released.

Further, when the lock knob 133 of the inside handle assembly 130 is leaned toward the lock side, the door lock mechanism assembly 110 is driven via a lock knob rod 134, so that the driver's seat side door is locked in the same way as with the case of the lock actuation by the key. In addition, the status switch 112 is turned off.

When the key is further rotated to a set position, a stopper is inserted into the door lock mechanism assembly 110 via a key rod 124, so that the driver's seat side door is set. Further, as far as the door lock knob 133 is not leaned toward the lock side, the door lock mechanism assembly 110 is so designed that the stopper will not be inserted therewithin. A set switch 125 for detecting that the key is rotated to a set position is provided in the key cylinder 123 of the driver's seat side door. Therefore, when the key is rotated to the set position, the set switch 25 is turned on. Under the condition that the key is located at the set position, even if the key is released from the driver's hand, the key is not returned to the lock position or the neutral position. Therefore, when the key is removed from the key cylinder 123 under these conditions, the door setting operation ends.

Further, even if the key is rotated from the neutral position to the set position directly, after the door lock mechanism assembly 110 has been first driven to the lock side, the stopper is inserted into the door lock mechanism assembly 110 to set the driver's seat side door.

Under the conditions that the driver's seat side door is locked, when the key is rotated from the neutral position to the unlock position, the door lock mechanism assembly 110 is driven via the key rod 124, so that the driver's seat side door is unlocked. In addition, the status switch 112 is turned on.

Further, under the conditions that the driver's seat side door is locked, when the lock knob 133 of the inside handle assembly 130 is leaned toward the lock side, the door lock mechanism assembly 110 is driven via the lock knob rod 134 in the same way as the unlock operation by the key, so that the driver's seat side door is unlocked. In addition, the status switch 112 is turned on.

On the other hand, under the condition that the driver's seat side door is in the set status, when the key is rotated from the neutral position to the unlock position, the door lock mechanism 110 is driven via the key rod 124, so that the stopper inserted into the door lock mechanism assembly 110 is first extracted from the door lock mechanism assembly 110 to a refuge position. Therefore, the driver's seat side door is unlocked.

Further, when the key is released from the hand, although the key is returned from the unlock position to the neutral position by an elastic force of the spring, the driver's seat side door is kept unlocked.

Figure 4:
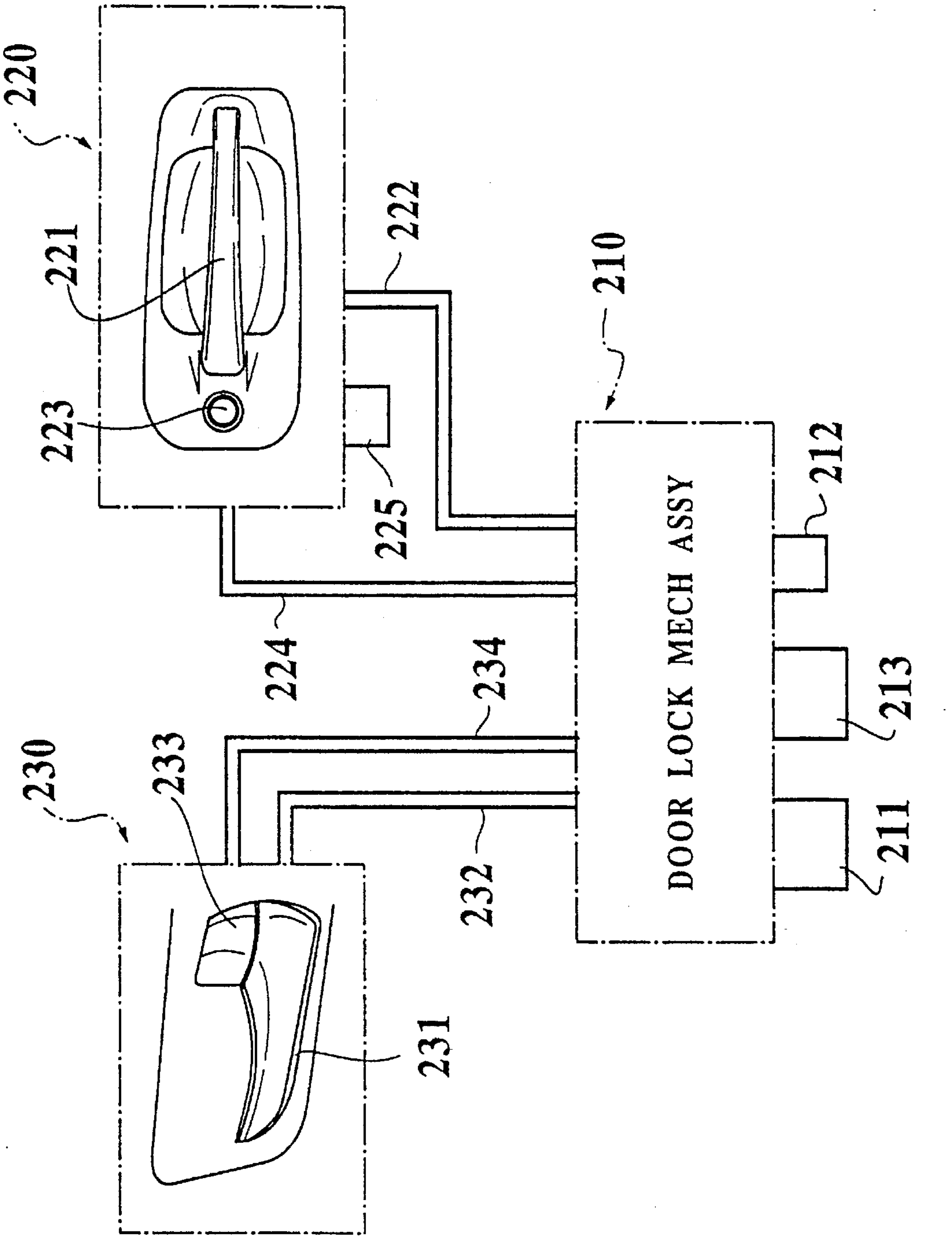
FIG. 4 is a block diagram showing one embodiment of a door lock mechanism provided for a front passenger's seat side door according to the present invention.

FIG. 4 shows an embodiment of a door lock mechanism provided for a front passenger's seat side vehicle door. In the drawing, a door lock mechanism assembly 210 locks or unlocks and sets or resets the front passenger's seat side door. The door lock mechanism assembly 210 includes a door lock actuator 211, a status switch 212 and a dead-lock actuator 213. The door lock actuator 211 drives the door lock mechanism assembly 210 to lock and unlock the front passenger's seat side door. The status switch 212 is turned off when the door lock mechanism assembly 210 changes from an unlocked status to a locked status, and turned on when changes from the locked status to the unlocked status. The dead-lock actuator 213 inserts a stopper into the door lock mechanism assembly 210 by use of another mechanism (not shown) to set the front passenger's seat side door or extracts the stopper from the door lock mechanism assembly 210 to a refuge position to reset the front passenger's seat side door. In other words, the front passenger's seat side door is set and reset by driving the dead-lock actuator 213.

Further, an outside handle assembly 220 provided outside the front passenger's seat side door and an inside handle assembly 230 provided inside the front passenger's seat side door are linked to the door lock mechanism assembly 210 via various rods.

Under the conditions that the front passenger's seat side door is in the unlocked status and further a reset status, when an outside handle 221 of the outside handle assembly 220 is actuated, an unlock actuation force is transmitted to the door lock mechanism assembly 210 via an outside handle rod 222, so that the front passenger's seat side door is opened by the door lock mechanism assembly 210.

In the same way, under the conditions that the front passenger's seat side door is in the unlocked status and further a reset status, when an inside handle 231 of the inside handle assembly 230 is actuated, an unlock actuation force is transmitted to the door lock mechanism assembly 210 via an inside handle rod 232, so that the front passenger's seat side door is opened by the door lock mechanism assembly 210.

Further, under the conditions that the front passenger's seat side door is in the locked status or the set status, even if the outside handle 221 or the inside handle 231 is actuated, the front passenger's seat side door cannot be opened.

When a key is inserted into a key cylinder 223 of the outside door handle assembly 220 and then rotated, an actuation force thereof is transmitted to the door lock mechanism assembly 210 via a key rod 224, so that the door lock mechanism assembly 210 is locked or unlocked and reset according to the angular positions of the key.

Figure 5:
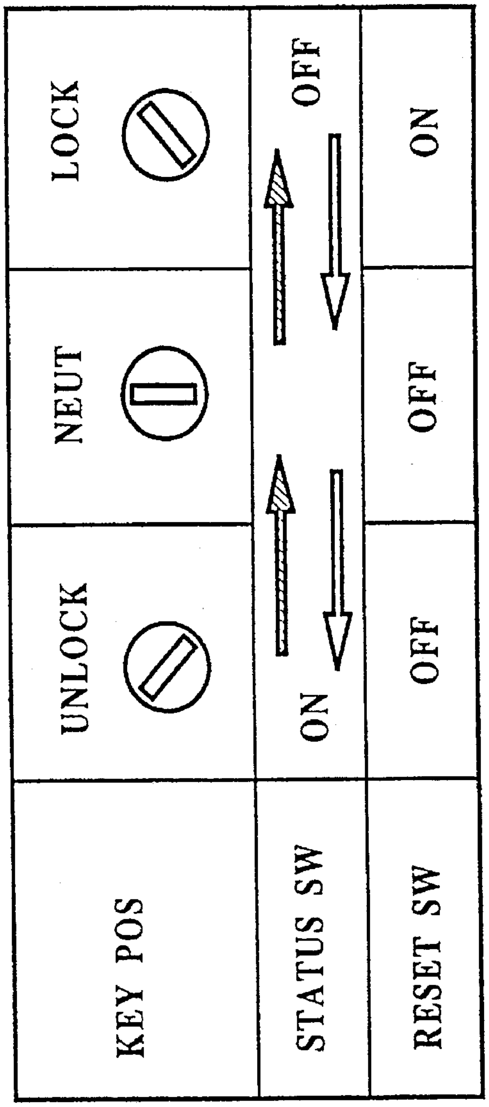
FIG. 5 is a table listing on-off relationship between key positions of the front passenger's seat side door and a door lock mechanism section (a status switch and a set switch)

FIG. 5 shows the relationship between the angular positions of the key inserted into the front passenger's seat side door and the door lock mechanism assembly 210.

That is, when the key is inserted into the key cylinder 223 of the front passenger's seat side door and then rotated from a neutral position to a lock position, the door lock mechanism assembly 210 is actuated via the key rod 224, so that the front passenger's seat side door is locked and further the status switch 212 is turned off.

Further, in this case, a drive force is transmitted from the door lock mechanism assembly 210 to the inside handle assembly 230 via a lock knob rod 234, so that a lock knob 233 of the inside handle assembly 230 is driven toward. the lock side.

Further, when the key is released from the driver's hand at the lock position, although the key is returned to the neutral position by an elastic force of a spring (not shown), the lock status of the door lock mechanism assembly 210 is not released.

Further, when the lock knob 233 of the inside handle assembly 230 is leaned toward the lock side, the door lock mechanism assembly 210 is driven via a lock knob rod 234, so that the front passenger's seat side door is locked in the same way as with the case of the lock actuation by the key. In addition, the status switch 212 is turned off.

A reset switch 225 for outputting a door reset signal is provided for the key cylinder 223 of the front passenger's seat side door. Therefore, when the key inserted into the key cylinder of the front passenger's seat side door is rotated to the lock position, this reset switch 225 is turned on.

Under the conditions that the front passenger's seat side door is locked, when the key is rotated from the neutral position to the unlock position, the door lock mechanism assembly 210 is driven via the key rod 224, so that the front passenger's seat side door is unlocked. In addition, the status switch 212 is turned on. Further, when the key is released from the hand at the unlock position, although the key is returned from the unlock position to the neutral position by an elastic force of the spring, the front passenger's seat side door is kept unlocked.

Further, under the conditions that the front passenger's seat side door is locked, when the lock knob 233 of the inside handle assembly 230 is leaned toward the unlock side, the door lock mechanism assembly 210 is driven via the lock knob rod 234 in the same way as the unlock actuation by the key, so that the front passenger's seat side door is unlocked. In addition, the status switch 212 is turned on.

Figure 6:
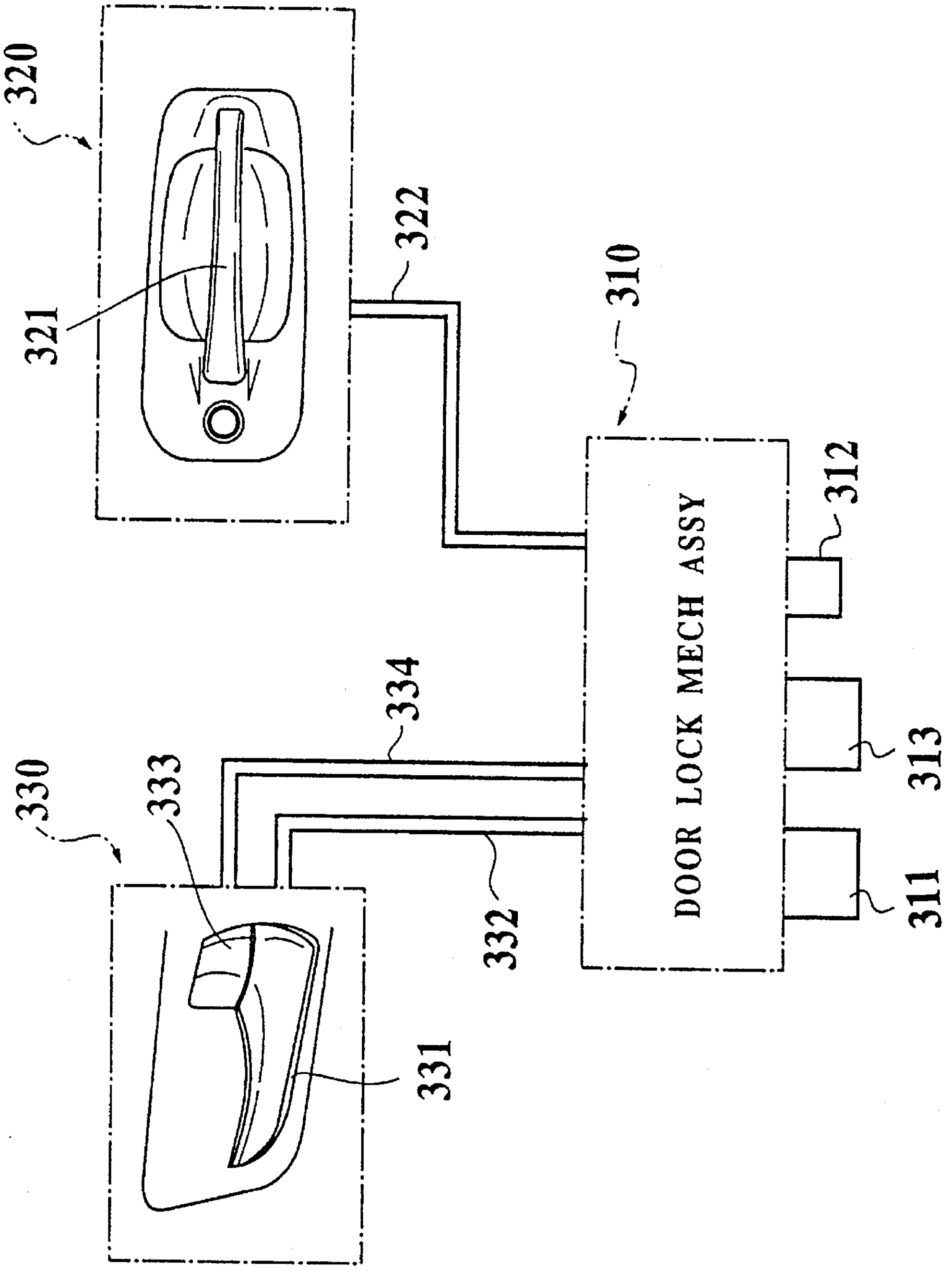
FIG. 6 is a block diagram showing one embodiment of a door lock mechanism provided for rear passenger's left side door according to the present invention.
Figure 6A:
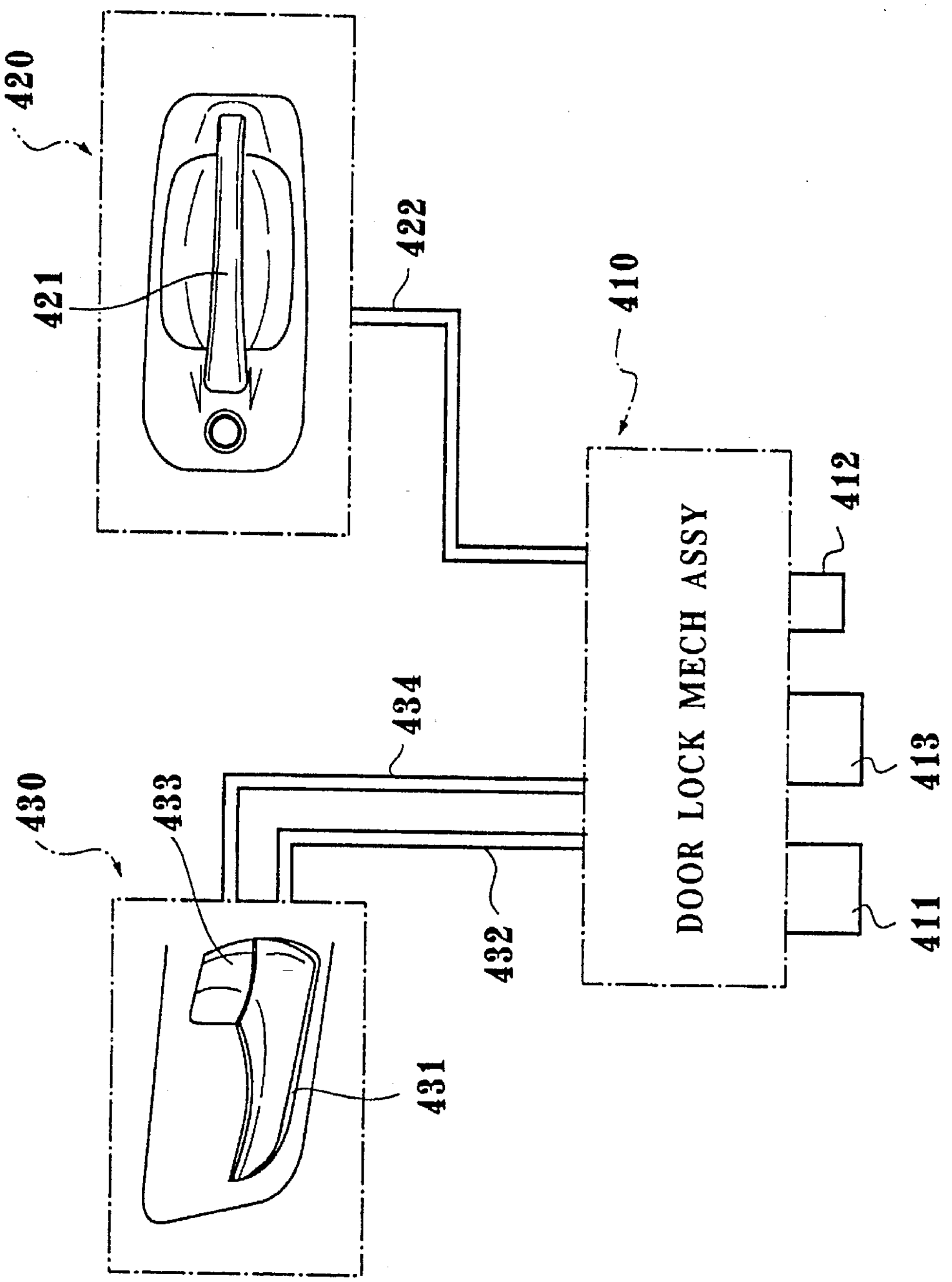
FIG. 6A is a block diagram showing the FIG. 6 embodiment adapted for rear passenger's right side doors.

FIG. 6 shows an embodiment of a door lock mechanism provided for a rear left passenger's seat side vehicle door. Further, since being quite the same as in FIG. 6, the door lock mechanism provided for a rear right passenger's side vehicle door as shown in FIG. 6A will be described hereinbelow simultaneously by describing the reference numerals in parentheses.

In the drawings, a door lock mechanism assembly 310 (410) locks or unlocks and sets or resets the rear left (right) passenger's seat side door. The door lock mechanism assembly 310 (410) includes a door lock actuator 311 (411), a status switch 312 (412) and a dead-lock actuator 313 (413). The door lock actuator 311 (411) drives the door lock mechanism assembly 310 (410) to lock and unlock the rear left (right) passenger's seat side door. The status switch 312 (412) is turned off when the door lock mechanism assembly 310 (410) changes from an unlocked status to a locked status, and turned on when changes from the locked status to the unlocked status. Further, the dead-lock actuator 313 (413) inserts a stopper into the door lock mechanism assembly 310 (410) by use of another mechanism (not shown) to set the rear left (right) passenger's seat side door or extracts the stopper from the door lock mechanism assembly 310 (410) to reset the rear left (right) passenger's seat side door. In other words, the rear left (right) passenger's seat side door is set and reset by driving the dead-lock actuator 313 (413).

Further, an outside handle-assembly 320 (420) provided outside the rear left(right) passenger's seat side door and an inside handle assembly 330 (43) provided inside the rear left (right) passenger's seat side door are linked to the door lock mechanism assembly 310 (410) via various rods.

Under the conditions that the rear left (right) passenger's seat side door is in the unlocked status and further a reset status, when an outside handle 321 (421) of the outside handle assembly 320 (420) is actuated, an unlock actuation force is transmitted to the door lock mechanism assembly 310 (410) via an outside handle rod 322 (422), so that the rear left (right) passenger's seat side door is opened by the door lock mechanism assembly 310 (410).

In the same way, under the conditions that the rear left (right) passenger's seat side door is in the unlocked status and further a reset status, when an inside handle 331 (431) of the inside handle assembly 330 (430) is actuated, an unlock actuation force is transmitted to the door lock mechanism assembly 310 (410) via an inside handle rod 332 (432), so that the rear left (right) passenger's seat side door is opened by the door lock mechanism assembly 310 (410).

Further, under the conditions that the rear left (right) passenger's seat side door is in the locked status or the set status, even if the outside handle 321 (421) or the inside handle 331 (431) is actuated, the rear left (right) passenger's seat side door cannot be opened.

Figure 7:
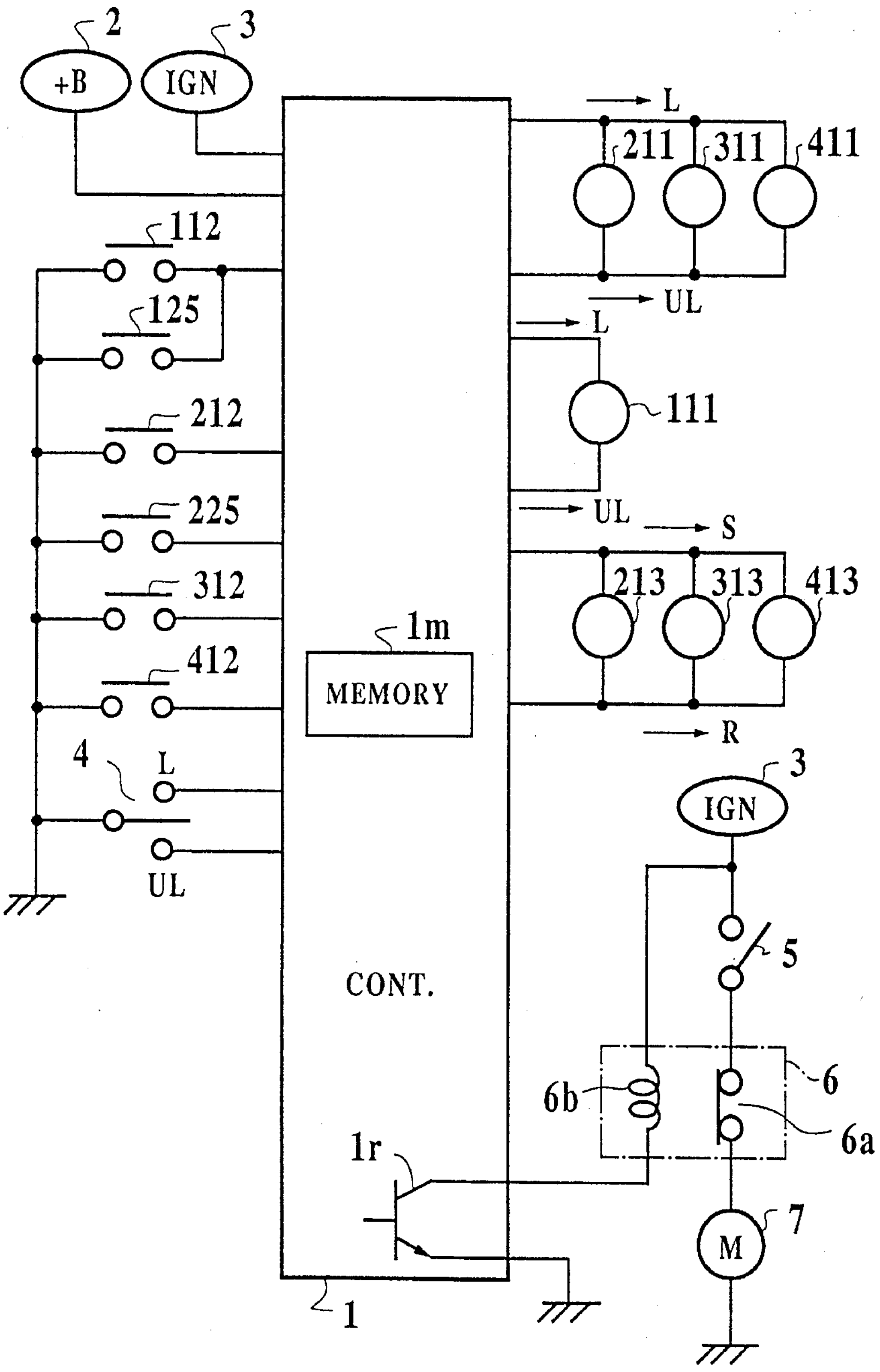
FIG. 7 is a block diagram showing an embodiment of a circuit according to the present invention.

FIG. 7 is a block diagram showing an embodiment of an electric circuit of the antitheft apparatus according to the present invention.

A controller includes peripheral parts such as a microcomputer, a memory 1*m*, etc. and a drive circuit such as a transistor 1*r*, etc. to control the locking/unlocking and setting/resetting of the respective doors and further starter motor driver circuits. Further, the memory 1*m* stores a flag F indicative of the set status and the reset status, respectively. Therefore, when a set signal is outputted to the dead-lock actuators 213, 313 and 413, the flag F is set (1). When a reset signal is outputted, the flag F is reset (0). A power is supplied to the controller 1 from a battery power source 2 and an ignition power source 3. The battery power source 2 supplies power directly to the controller 1, irrespective of the ignition key position. The ignition power source 3 supplies power to the controller 1 only when the ignition switch 5 is located at ON or START position.

The afore-mentioned various switches such as driver's seat side door status switch 112 and set switch 125, the front passenger's seat side door status switch 212 and reset switch 225, and the rear passenger's seat side door status switches 312 and 412 are all connected to the controller 1. Further, a centralized door lock switch 4 is provided inside the driver's seat side door. All the doors other than the driver's seat side door can be locked when this switch 4 is actuated to a lock (L) side and unlocked when actuated to an unlock (UL) side.

In addition, the afore-mentioned driver's seat side door lock actuator 111, the front passenger's seat side door lock actuator 211 and dead-lock actuator 213, the rear left passenger's seat side door lock actuator 311 and dead-lock actuator 313, and the rear right passenger's seat side door lock actuator 411 and dead-lock actuator 413 are connected to the controller 1.

The door lock actuators 211, 311 and 411 other than the driver's seat side actuator are connected in parallel and therefore driven simultaneously by the controller 1. The respective doors are locked when current is passed from the controller 1 to the actuators 111, 211, 311, and 411 in the L direction, and unlocked when passed in the UL direction in FIG. 7. Further, the dead-lock actuators 213, 313 and 413 are connected in parallel and therefore driven simultaneously by the controller 1. The respective doors other than the driver's seat side door are set when current is passed from the controller 1 to the actuators 213, 313 and 413 in the S direction, and reset when passed in the R direction in FIG. 7.

Further, a starter motor drive circuit is connected to the controller 1. The starter motor drive circuit supplies drive power from the ignition power source 3 to the starter motor 7 via the ignition switch 5 and a relay contact 6*a* of a starter cut relay 6. The ignition switch 5 is turned on when the ignition key is located at the START position. Further, a coil 6*b* of the starter cut relay 6 is connected to the ignition power source 3 and controlled by the transistor 1*t* of the controller 1. When the transistor 1*t* is turned on by the controller 1, current flows from the ignition power source 3 to the ground by way of the coil 6*b* and the transistor 1*t*, so that the relay 6 is energized to open (off) the relay contact 6*a*. Under these conditions, even when the ignition key is rotated to the START position, since the relay contact 6*a* is opened, the starter motor 7 cannot be started.

Figure 8:
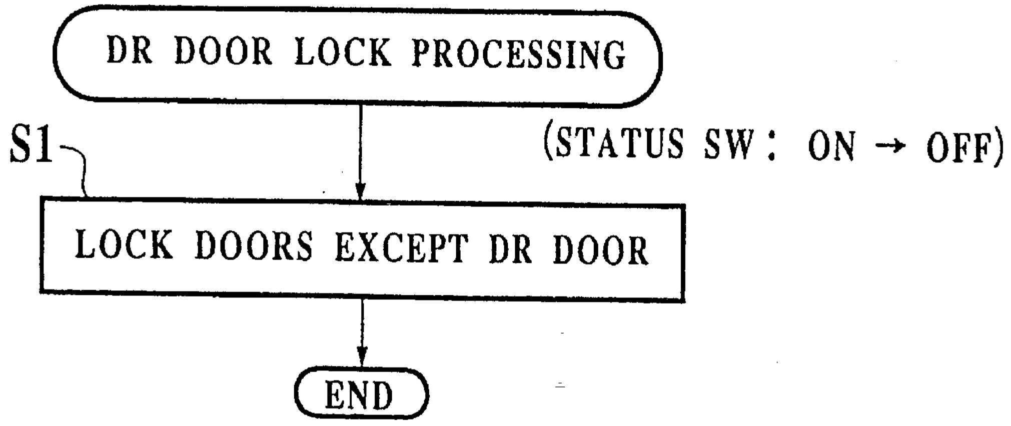
FIG. 8 is a flowchart showing a routine for the driver's seat side locking processing.

FIG. 8 is a flowchart showing a lock processing routine started by the driver's seat side door key.

The microcomputer of the controller 1 (referred to as control, hereinafter) executes this processing routine when the status switch 112 of the driver's seat side door changes from the closed status (ON) to the open status (OFF). In step S1, controller 1 drives the door lock actuators 211, 311 and 411 to lock the doors other than the driver's seat side door. Further, in the driver's seat side door, the door lock mechanism assembly 110 is mechanically driven to the lock status by the key rod 124 linked with the door key, as already explained.

Figure 9:
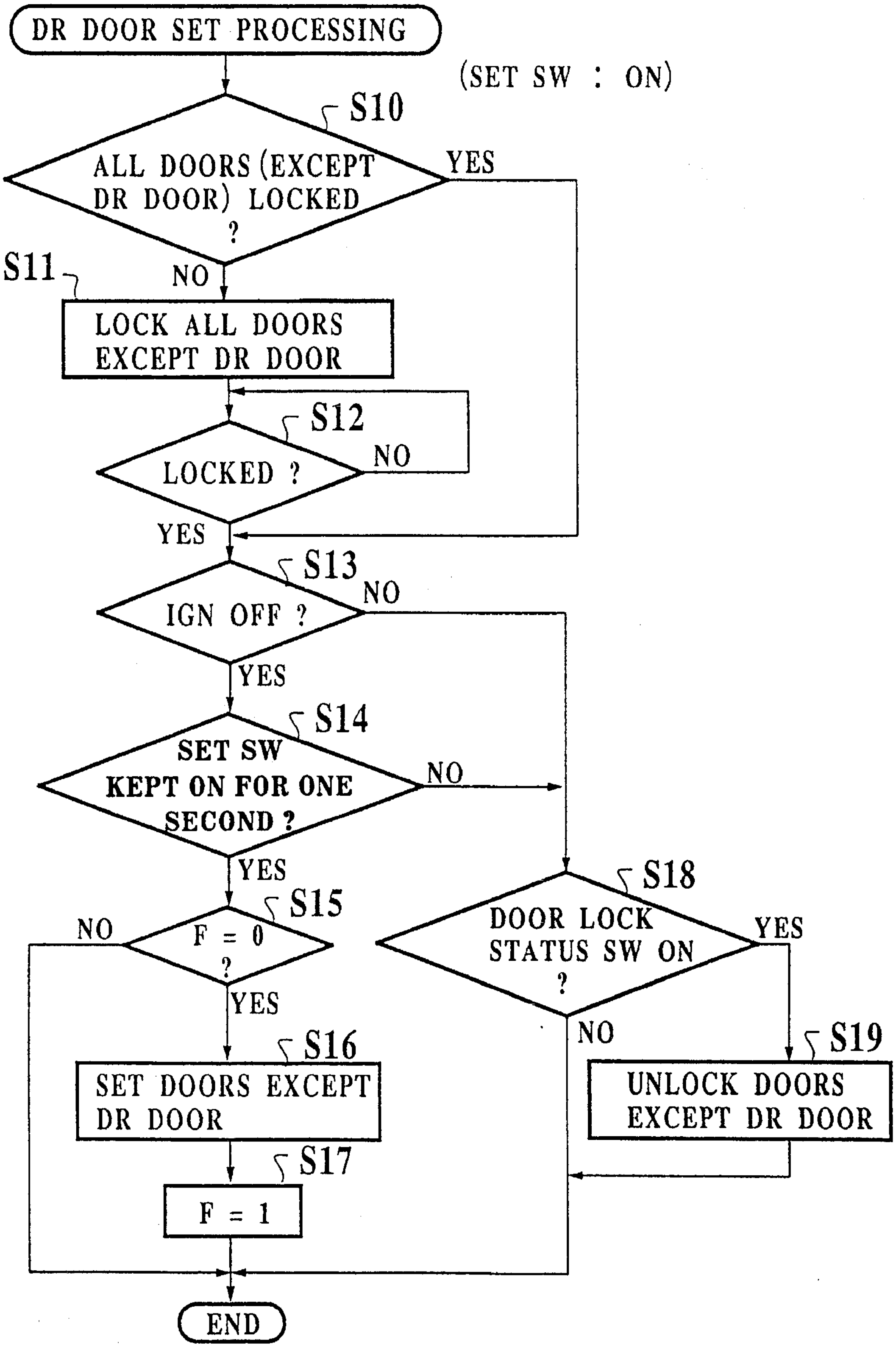
FIG. 9 is a flowchart showing a routine for the driver's seat side setting processing.

FIG. 9 is a flowchart showing a set processing routine started by the driver's seat side door key. This door setting operation is described with reference to FIG. 9.

The microcomputer of the controller 1 executes this processing routine when the key set switch 115 is closed (ON). In step S10, controller 1 discriminates whether all the doors other than the driver's seat side door are locked on the basis of the status switches 212, 312 and 412. If locked, control proceeds to step S13. If not locked, control proceeds to step S11. When any door is in the unlock status, in step S11 control drives the actuators 211, 311 and 411 to lock all the doors other than the driver's seat side door. That is, since the doors can be set only when the doors have been locked, the door locking operation is effected before the door setting operation is effected. Further, the driver's seat side door is locked mechanically in linkage with the door key of the driver's seat side door. Successively, in step S12, control discriminates whether the doors other than the driver's seat side door have been locked on the basis of the status switches 212, 312 and 412, and proceeds to step S13 when the door locking operation has been completed. When the door lock actuators are driven for locking operation in spite of the fact that all the doors have been locked, since power is consumed wastefully, control skips steps S11 and S12 and proceeds to step S13. In step S13, control discriminates whether the power supply from the ignition power source 3 is stopped; that is, whether the ignition switch is turned off or not. If the ignition switch is turned off, control proceeds to step S14. If not so, control proceeds to step S18.

Further, here, the status where the ignition switch key is located at the 0N or START position and thereby the ignition power source is being supplied is referred to as an ignition-on status, and the status where the ignition switch key is located at the ACC or Off position and thereby the ignition power source is not being supplied is referred to as an ignition-off status, respectively.

In step S14, control discriminates whether the set switch 125 is kept turned on for one second; that is, the driver's seat side door key is kept located at the set position. If kept located at the set position, control proceeds to step S15. If not so, control proceeds to step S18. In step S15, control discriminate whether the flag F of the memory **1*m* is reset (0); that is, whether the doors are in the reset status. If in the reset status, control proceeds to step S16. If not so, control ends the processing. Further, when the doors have been reset, in step S16, control drives the dead-lock actuators 213, 313 and 413 to set the doors other than the driver's seat side door, proceeding to step S17. Further, in the driver's seat side door, the stopper is inserted into the door lock mechanism assembly 110 by the key rod 124 linked with the door key, as already described, so that the door is set mechanically. In step S17, control sets the flag F of the memory 1*t*** to (1), ending the processing.

On the other hand, when the ignition switch is not turned off or when the driver's seat side door key is not located to the set position, control discriminates whether the status switch 112 is turned on (closed). If turned on, control proceeds to step S19 to drive the actuators 211, 311 and 411 to unlock the doors other than the driver's seat side door. If turned off (opened), control ends the processing under the conditions that all the doors are kept locked.

Figure 10:
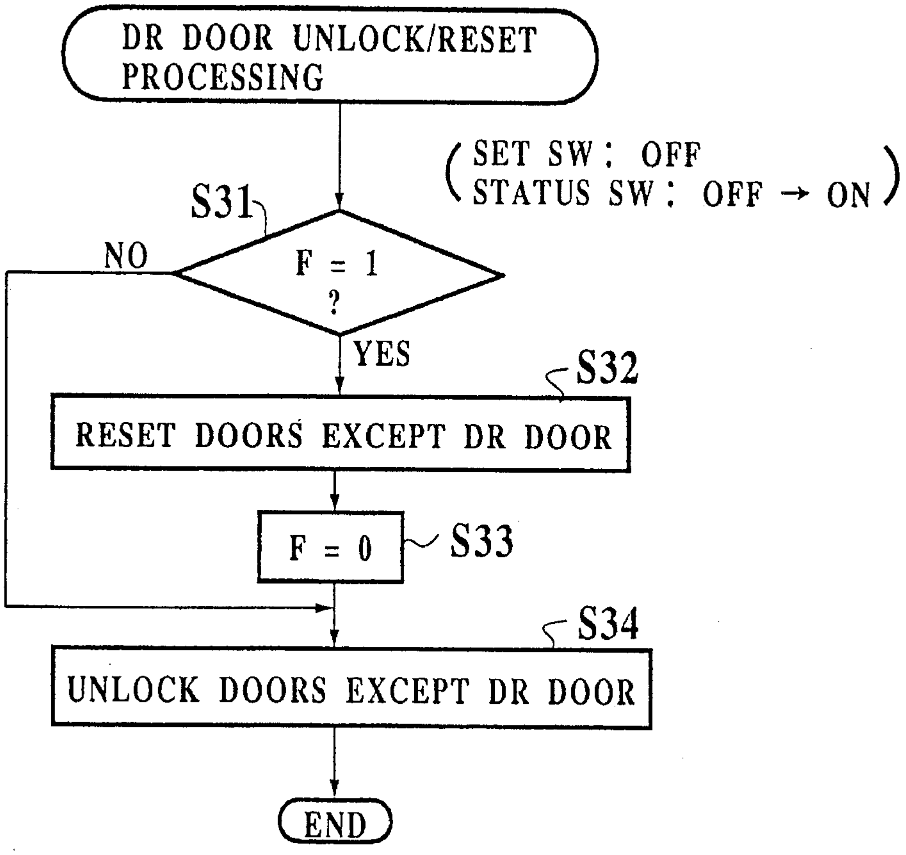
FIG. 10 is a flowchart showing a routine for the driver's seat side unlocking and/or resetting processing.

FIG. 10 is a flowchart showing an unlock/reset processing routine started by the driver's seat side door key. The door unlocking and resetting operation is described with reference to FIG. 10.

The microcomputer of the controller 1 executes this processing routine when the set switch 125 is turned off and further the status switch 112 is turned on. In step S31, control first discriminates whether the flag F of the memory **1*m* is set; that is, whether the doors are in the set status. If in the set status, control proceeds to the step S32. If not so, control proceeds to step S34. In step S32, control drives the dead-lock actuators 213, 313 and 413 to reset the doors other than the driver's seat side door, and proceeds to step S33. In step S33, control sets the flag F. Further, in step S34, control drives the door lock actuators 211, 311 and 411** to unlock the doors other than the driver's seat side door. Further, the driver's seat side door is reset and unlocked mechanically as already explained.

Figure 11:
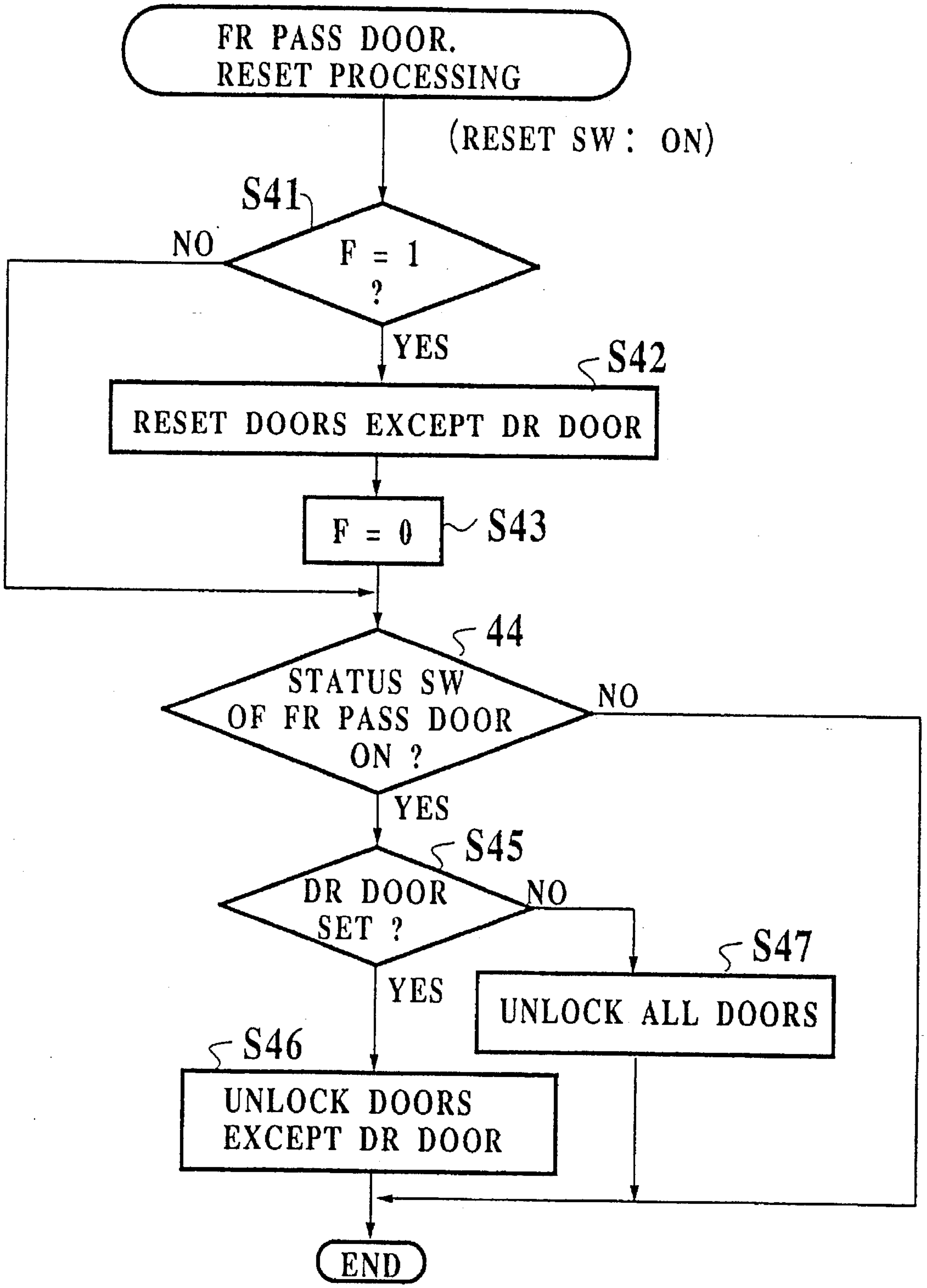
FIG. 11 is a flowchart showing a routine for the front passenger's seat side resetting processing.

FIG. 11 is a flowchart showing a reset processing routine started by the front passenger's seat side door key. The reset operation will be described with reference to this flowchart.

In the reset operation by the front passenger's seat side door key, since the front passenger's seat side door itself is in the set status, the key cannot be rotated in the unlock direction. Therefore, the key is first rotated to the lock position for resetting, and then rotated to the unlock position for unlocking.

The computer of the controller 1 executes this processing routine when the front passenger's seat side door key is rotated to the lock position and further the reset switch 225 is turned on. First, in step S41, control discriminates whether the flag F of the memory 1 is set; that is, whether the doors are in the set status. If in the set status, control proceeds to step S42. If not so, control proceeds to step S44. In the set status, in step S42, control drives the dead-lock actuators 213, 313 and 413 to reset the doors other than the driver's seat side door. In step S43, control resets the flag F (0), and proceeds to step S44. In step S44, control discriminates whether the front passenger's seat side door key is rotated to the unlock position so that the status switch 212 is turned on. If turned on, control proceeds to step S45. If not so, control ends the processing. In step S45, control discriminates whether the set switch 125 is in the turn-on status; that is, the driver's seat side door is set. If set, control proceeds to step S46. If not so, control proceeds to step S47. When the driver's seat side door is set, in step S46, control drives the actuators 211, 311 and 411 to unlock the doors other than the driver's seat side door. On the other hand, when the driver's seat side door is not set, in step S47, control drives the actuators 111, 211, 311 and 411, to unlock all the doors.

Figure 12:
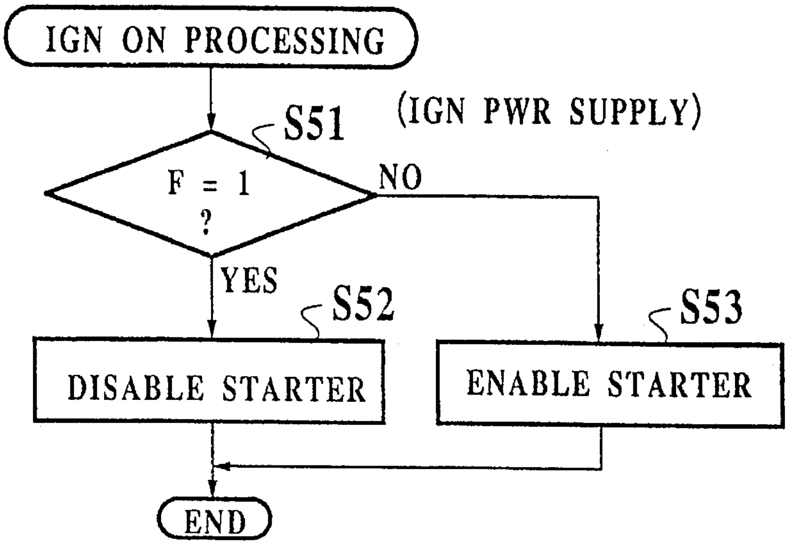
FIG. 12 is a flowchart showing a routine for the ignition-on processing.

FIG. 12 is a flowchart showing a processing routine started when the invention is turned on. The enable and disable operation of the starter motor 7 will be described with reference to this flowchart.

The microcomputer of the controller 1 executes this routine when the power is supplied from the ignition power source 3. First, in step S51, control discriminates whether the flag F indicative of the set status of the doors is set or not. If set, control proceeds to step S52. If not so, control proceeds to step S53.

When the flag F is set, since the doors are in the set status, it is impossible to start the starter motor; that is, to drive the vehicle in this status. Accordingly, even if the ignition is turned on under the condition that the doors are in the set status, the starter motor 7 will not be activated. In more detail, the transistor **1*t* is turned on to energize the starter cut-off relay 6, so that the relay contact 6a is open to cut off the starter motor drive circuit. Accordingly, even if when the ignition switch 5 is turned on, power is not supplied to the starter motor 7**.

On the other hand, when the flag F is reset, the doors are in the reset status. Therefore, in step S53, control enables the starter motor 7 to be started. In more detail, the transistor 1t is turned off to deenergize the starter cut-off real 6, so that the relay contact 6a is closed. Accordingly, in this status, when the ignition switch 5 is turned on, power is supplied from the ignition power source 3 to the starter motor 7 via the ignition switch 5 and the relay contact 6a, so that the starter motor 7 is rotated to start the engine.

As described above, when the doors are set by the driver's seat side door key, since the doors are once locked by driving the door actuators and thereafter the doors are set by driving the dead-lock actuators, even if the doors are locked and then unlocked, it is possible to securely set all the doors by locking the doors again whenever the doors are required to be set.

Further, under the condition that the door set operation is effected by use of the driver's seat side door key, when the door unlock status is detected, since the doors are locked and then set, it is possible to securely set all the doors, while saving the power consumption required when the doors are set.

Further, in the above-mentioned embodiment, the driver's seat side door is locked/unlocked or set/reset mechanically. Without being limited thereto, however, it is of course possible to drive the driver's seat side door by actuating the lock actuator and dead-lock actuator electrically in the same way as with the case of the other doors. In this case, when the door reset operation is effected by the driver's seat side door key, all the doors including the driver's seat side door are locked by the lock actuators, and thereafter all the doors including the driver's seat side door are set by the dead-lock actuators.

Further, the commanding means for outputting the door set command is not limited to only the set switch of the above-mentioned embodiment.

Further, in the case where an engine control apparatus for controlling engine operation is mounted on an automotive vehicle, it is possible to disable the engine from being started by other methods, whenever the ignition is turned on in the door set status. In this case, an engine start stop signal is transmitted from the controller 1 to the engine control apparatus to cut off the ignition power source or to stop fuel from being supplied to the engine, for instance.

In the above-mentioned embodiment, when the doors are set, the engine start is disabled by cutting off the power supplied to the starter motor drive circuit. In the case of an automotive vehicle on which an automatic transmission is mounted, it is possible to transmit a signal to a shift lock control unit, so that a select lever can be locked at the parking position.

Further, in the above-mentioned embodiment, the door lock mechanism assemblies 110, 210, 310 and 410 correspond to the locking means and the constraining means; the set switch 125 corresponds to the commanding means; the controller 1 corresponds to the drive control means; and the status switches 112, 212, 312 and 412 correspond to the unlocking detecting means, respectively.

As described above, in the antitheft apparatus according to the present invention, when the command for constraining the door lock status is outputted, since the locking operation is first effected by the locking means and thereafter the locking means are constrained to the locked status, even if the door is unlocked after the doors have been locked, the locking operation is effected again whenever the locking status is constrained, so that it is possible to securely constrain all the doors to the locking status.

Further, when the command for constraining the door lock status is outputted, since the locking operation is effected whenever the door unlock status is detected and thereafter the locking means is constrained to the door lock status, it is possible to save power consumption whenever the door lock status is constrained, while constraining all the doors to the door lock status securely.

What is claimed is:

1. An antitheft apparatus for an automotive vehicle, comprising:

locking means for locking vehicle doors;

constraining means for constraining said locking means once actuated to a lock status so as not to be unlocked;

commanding means for outputting a constraint command for constraining said locking means once actuated to the lock status so as not to be unlocked; and drive control means responsive to the constraint command outputted by said commanding means, for first locking the doors by said locking means and then constraining said locking means to the lock status by said constraining means.

2. The antitheft apparatus of claim 1, which further comprises unlock detecting means for detecting an unlock status of said locking means; and wherein when said commanding means outputs the constraint command and further said unlock detecting means detects the unlock status of said locking means, said drive control means first locks the doors by said locking means and then constrains said locking means to the lock status by said constraining means.

3. A method of theft prevention for an automotive vehicle by an antitheft apparatus having: locking means for locking vehicle doors; constraining means for constraining said locking means once actuated to a lock status so as not to be unlocked; and commanding means for outputting a constraint command for constraining said locking means once actuated to the lock status so as not to be unlocked, which comprises the steps of:

when said commanding means outputs the constraint command, locking the doors by said locking means; and constraining said locking means to the lock status by said constraining means.

4. A method of theft prevention for an automotive vehicle by an antitheft apparatus having: locking means for locking vehicle doors; constraining means for constraining said locking means once actuated to a lock status so as not to be unlocked; commanding means for outputting a constraint command for constraining said locking means once actuated to the lock status'so as not to be unlocked; and unlock detecting means for detecting an unlock status of said locking means, which comprises the steps of:

when said commanding means outputs the constraint command and further said unlock detecting means detects the unlock status of said locking means, locking the doors by said locking means; and constraining said locking means to the lock status by said constraining means.

5. The antitheft apparatus of claim 1, further comprising:

an ignition switch for connecting and disconnecting a current supply path to and from a starter motor;

wherein said drive control means, responsive to a constrain status of said constraining means, disconnects the current supply path to the starter motor even when the ignition switch is turned on.

6. An antitheft apparatus for an automotive vehicle, comprising:

a lock assembly;

an actuator for constraining the lock assembly in a locked position;

a drive device for driving the lock assembly to a locked position and the actuator to a lock constrained position; and a commanding device for issuing a single command signal responsive to which the drive device operates to drive the lock assembly to the locked position and the actuator to the lock constrained position.

7. An antitheft apparatus according to claim 6, further comprising:

a sensor for detecting if the lock assembly is in an unlocked position;

wherein said drive device operates to drive the lock assembly to the locked position and the actuator to the lock constrained position only if the sensor detects that the lock assembly is in the unlocked position.

8. An antitheft apparatus according to claim 6, wherein said drive device operates to drive the lock assembly to the locked position responsive to said single command signal only if the lock assembly is in an unlocked position, to thereby avoid unnecessarily powering the drive device.

9. An antitheft apparatus according to claim 6, further comprising:

a driver door lock assembly, having a key cylinder rotatable between a neutral position and a lock position and a secure position, said lock position being disposed between said neutral position and said secure position;

a driver door actuator constraining the driver door lock assembly in a locked position; and a driver door drive device for driving the driver door lock assembly to a locked position and the driver door actuator to a lock constrained position;

wherein the commanding device is configured to issue a first driver door lock command signal which commands the driver door drive device to drive the driver door lock assembly to a locked position responsive to said key cylinder being rotated to the lock position, and to issue a second driver door lock command signal which commands the driver door drive device to drive the driver door actuator to the lock constrained position responsive to said key cylinder being rotated to the secure position.

10. An antitheft apparatus according to claim 9, further comprising a key insertable into said key cylinder for rotating said key cylinder between the neutral position and the lock position and the secure position, wherein the key is removable from said key cylinder only with said key cylinder in said neutral position or said secure position.

11. An antitheft apparatus according to claim 6, further comprising:

an ignition switch having a start position for connecting a current supply to a starter motor of the vehicle;

a driver door lock assembly;

a driver door actuator for constraining the driver door lock assembly in a locked position; and a driver door drive device for driving the driver door lock assembly to the locked position responsive to a driver door lock command signal from the controller and for driving the driver door actuator to a lock constrained position responsive to a driver door secure command signal from the controller;

at least one sensor for detecting if the actuator is in the lock constrained position and the driver door actuator is in the lock constrained position;

wherein, said commanding device prevents the current supply to the starter motor with the ignition switch in the start position if the at least one sensor detects that the actuator and the driver door actuator are in the lock constrained position.

12. An antitheft apparatus according to claim 6, further comprising:

a key cylinder having a first position and a second position, wherein (i) responsive to said key cylinder being positioned in the first position, the lock assembly is driven to the locked position and the actuator is driven to the lock constrained position, and (ii) responsive to the key cylinder being positioned in the second position, the lock assembly is driven to an unlocked position and the actuator is driven to a lock unconstrained position;

a driver door lock assembly;

a driver door actuator for constraining the driver door lock assembly in a locked position; and a driver door drive device for driving the driver door lock assembly to a locked position or to an unlock position;

wherein, with the driver door lock assembly in the locked position and the driver door actuator in a lock unconstrained position, responsive to the key cylinder being positioned in the second position, the commanding device is configured to issue a driver door unlock command signal responsive to which the driver door drive device operates to drive the driver door lock assembly to an unlocked position.

13. An antitheft apparatus according to claim 6, further comprising:

a key cylinder having a first position and a second position, wherein (i) responsive to said key cylinder being positioned in the first position the lock assembly is driven to the locked position and the actuator is driven to the lock constrained position, and (ii) responsive to the key cylinder being positioned in the second position the lock assembly is driven to an unlocked position and the actuator is driven to a lock unconstrained position;

a driver door lock assembly;

a driver door actuator for constraining the driver door lock assembly in a locked position;

a driver door drive device for driving the driver door lock assembly to the locked position or to an unlocked position;

a passenger door lock assembly;

a passenger door actuator for constraining the passenger door lock assembly in a locked position; and a passenger door drive device for driving the passenger door lock assembly to the locked position or to an unlocked position;

wherein with the driver door lock assembly in the locked position and the driver door actuator in the lock constrained position, responsive to the key cylinder being positioned in the second position, the commanding device is configured to issue a passenger door unlock command signal responsive to which the passenger door drive device operates to drive the passenger door lock assembly to an unlocked position.

14. An antitheft apparatus according to claim 6, further comprising:

a key cylinder having a first position and a second position, wherein responsive to said key cylinder being positioned in the first position the lock assembly is driven to the lock position and the actuator is driven to the lock constrained position, and responsive to the key cylinder being positioned in the second position the lock assembly is driven to an unlock position and the actuator is driven to a lock unconstrained position;

a driver door lock assembly;

a driver door actuator for constraining the driver door lock assembly in a locked position;

a driver door drive device for driving the driver door lock assembly to a locked position or to an unlocked position;

a passenger door lock assembly;

a passenger door actuator for constraining the passenger door lock assembly in a locked position; and a passenger door drive device for driving the passenger door lock assembly to the locked position or to an unlocked position;

wherein with the driver door lock assembly in the locked position and the driver door actuator in the lock unconstrained position, responsive to the key cylinder being positioned in the second position, the commanding device is configured to issue a passenger door unlock command signal responsive to which the passenger door drive device operates to drive the passenger door lock assembly to an unlocked position and to issue a driver door unlock command signal responsive to which the driver door drive device operates to drive the driver door lock assembly to an unlocked position.

* * * * *